United States Patent
Massucci et al.

(10) Patent No.: US 7,162,459 B2
(45) Date of Patent: Jan. 9, 2007

(54) METHOD AND SYSTEM FOR ESTIMATING WEIGHTS OF MAILPIECES

(75) Inventors: John E. Massucci, Eastchester, NY (US); Robert A. Cordery, Danbury, CT (US); John P. Miller, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 562 days.

(21) Appl. No.: 10/326,511

(22) Filed: Dec. 19, 2002

(65) Prior Publication Data

US 2004/0122778 A1    Jun. 24, 2004

(51) Int. Cl.
G06F 17/60 (2006.01)
G06F 11/20 (2006.01)
G07B 17/02 (2006.01)

(52) U.S. Cl. ............... 705/401; 73/1.181; 73/1.13; 73/23.28; 705/400; 705/406; 705/413; 705/414; 705/418

(58) Field of Classification Search .......... 705/1, 705/401
See application file for complete search history.

(56) References Cited

U.S. PATENT DOCUMENTS

| | | | |
|---|---|---|---|
| 2,689,082 A | 9/1954 | Kolisch | |
| 3,916,695 A | 11/1975 | Branecky | |
| 4,516,209 A * | 5/1985 | Scribner | 705/406 |
| 4,718,507 A | 1/1988 | Howlett et al. | |
| 4,742,878 A * | 5/1988 | Freeman et al. | 177/25.15 |
| 4,760,534 A | 7/1988 | Fougere et al. | |
| 4,857,748 A | 8/1989 | Takaguchi | |
| 4,914,307 A | 4/1990 | Kanev | |
| 4,931,658 A | 6/1990 | Tole | |
| 4,993,835 A | 2/1991 | Inoue et al. | |
| 4,996,440 A | 2/1991 | Nordbryhn | |
| 5,004,929 A | 4/1991 | Kakinoki et al. | |
| 5,088,827 A | 2/1992 | Kyriakis | |
| 5,102,223 A | 4/1992 | Uesugi et al. | |
| 5,121,328 A * | 6/1992 | Sakai et al. | 705/407 |
| 5,229,597 A | 7/1993 | Fukatsu | |
| 5,264,665 A | 11/1993 | Delfer, III | |
| 5,289,261 A | 2/1994 | Yogo et al. | |

(Continued)

FOREIGN PATENT DOCUMENTS

JP     2001232299     8/2001

*Primary Examiner*—John W. Hayes
*Assistant Examiner*—Jon Bass
(74) *Attorney, Agent, or Firm*—Brian A. Lemm; Angelo N. Chaclas

(57) ABSTRACT

A weight estimating system for estimating the weight of a mailpiece and a postage metering system including such a weight estimating system. The weight estimating system includes a measuring system, a diverter mechanism and a microprocessor system. The measuring system includes a transport, a first plurality of detectors for measuring the dimensions of the mailpiece and a second plurality of detectors for measuring values of other characteristics of the mailpiece which are indicative of the presence of non-paper materials in the mailpiece as the mailpiece is transported. The microprocessor is responsive to the second detectors to determine if non-paper materials are included in the mailpiece and, if not, determines the volume from the dimensional measurements and estimates the weight as the product of the volume and a density for paper output an appropriate postage amount to the meter and the mailpiece to the printer. The postage metering system prints the mailpiece with a postal indicium and accounts for the postage amount expended. Otherwise the microprocessor controls the diverter mechanism to reject the mailpiece for separate processing.

17 Claims, 2 Drawing Sheets

U.S. PATENT DOCUMENTS

| | | |
|---|---|---|
| 5,305,091 A | 4/1994 | Gelbart et al. |
| 5,305,895 A | 4/1994 | Hermann |
| 5,321,273 A | 6/1994 | Kamiyama et al. |
| 5,325,178 A | 6/1994 | Louis et al. |
| 5,331,118 A * | 7/1994 | Jensen .................. 177/25.14 |
| 5,734,476 A | 3/1998 | Dlugos |
| 5,770,864 A | 6/1998 | Dlugos |
| 5,777,746 A | 7/1998 | Dlugos |
| 5,793,652 A * | 8/1998 | DeBarber et al. ........... 702/173 |
| 5,808,912 A | 9/1998 | Dlugos et al. |
| 5,815,274 A | 9/1998 | Dlugos |
| 5,841,541 A | 11/1998 | Dlugos |
| 5,878,379 A | 3/1999 | Dlugos et al. |
| 5,909,013 A | 6/1999 | Dlugos |
| 5,914,463 A * | 6/1999 | Dlugos .................... 177/25.11 |

* cited by examiner

METHOD AND SYSTEM FOR ESTIMATING WEIGHTS OF MAILPIECES

BACKGROUND OF THE INVENTION

The present invention relates to a system and method for rapidly and confidently estimating the weights of mailpieces. More particularly it relates to weighing systems used in postage metering systems used to weigh and determine postage for mailpieces.

Postal scale systems are well known. Such scale systems weigh a mail piece and determine the appropriate postage for that mail piece as a function of the weight. Postal mailing systems where a mail piece is transported onto a postage scale system, the appropriate postage is determined, and the mail piece is then transported to postage metering system for imprinting with a postal indicium representative of the postage determined are also known. One such system is described in U.S. Pat. No. 4,742,878; issued May 10, 1988. In such systems there is a constant need to increase the rate at which the scale can determine the weight of a mailpiece in order that the throughput of the system can be increased.

Heretofore mailpiece weights typically have been determined by measuring the response of spring or other resilient member when the weight of a mailpiece is applied. Such systems have been successful but suffer from the inherent disadvantage that all such systems have a transitory initial response to the application of weight; and time must be allowed for the initial response to damp out and the system to reach, or at least approach, a steady state response, which is proportional to the mailpiece weight. Further such systems typically require a platform or support lager enough to support the largest mailpiece anticipated; and, where a sequence of mailpieces is to be transported through the system for processing, it is frequently necessary to halt each mailpiece to obtain an accurate weight measurement, thus further slowing or complicating the transport process.

An alternative approach that has been considered is sometimes referred to as to as dimensional weighing; where a mailpiece weight is estimated by measuring the mailpiece volume and multiplying the volume by a predetermined density for paper (preferably taken to be approximately 0.54 ounces/cubic inch). It is believed that a dimensional weighing system would be, relative to typical weighing systems, both faster, since dimensional measurements can easily be made as the mailpieces are transported at a relatively high continuous speed, and less expensive, since the various complex measures taken to reduce the time required to obtain an accurate weight are not needed. Dimensional weighing systems also have the advantage that dimensional measurements can be made as a mailpiece is transported transversely to a cross sectional plane so that the need for an extended platform to support the mailpiece as the weight is determined is eliminated and the system footprint is reduced; nor is it necessary to stop each mailpiece to determine its weight. Dimensional weighing systems have not, however, proven successful because of a low confidence in their accuracy, as materials other than paper incorporated in a mailpiece can cause large deviations between the actual weight and the weight estimated by dimensional weighing.

Thus it is an object of the subject invention to provide a dimensional weighing system that provides weight estimates which can be confidently accepted.

BRIEF SUMMARY OF THE INVENTION

The above object is achieved and the disadvantages of the prior art are overcome in accordance with the subject invention by a system and method for estimating the weight of a mailpiece as a product of the mailpiece volume and a density and for rejecting mailpieces that include non-paper materials. A postage metering system in accordance with the present invention includes: a dimensional weighing system a printer for receiving a mailpiece from the dimensional weighing system and printing a postal indicium thereon; and a postage meter responsive to the dimensional weighing system. The dimensional weighing system includes a measuring system, a diverter mechanism and a microprocessor system. The measuring system includes: a transport for transporting the mailpiece; a first plurality of detectors for measuring dimensions of the mailpiece as it is transported; and a second plurality of detectors for determining values for a plurality of other characteristics of the mailpiece as it is transported. The microprocessor system is responsive to the first plurality of detectors and the second plurality of detectors for controlling the dimensional weighing system, and in accordance with the method of the present invention is programmed to: determine if any of the values are outside a corresponding predetermined range; and if so to activate the diverter mechanism to reject the mailpiece; and otherwise to determine a volume for the mailpiece as a function of the measured dimensions; estimate a weight for the mailpiece as a product of the volume and a predetermined density; determine and output to the postage meter a postage amount in accordance with the estimated weight; and output the mailpiece to the printer for printing of the postal indicium.

In accordance with one aspect of the subject invention the other characteristics include maximum stiffness of the mailpiece.

In accordance with another aspect of the subject invention the other characteristics include dimensional uniformity of the mailpiece.

In accordance with another aspect of the subject invention the other characteristics include electromagnetic field variation of the mailpiece.

In accordance with still another aspect of the subject invention the other characteristics include total percentage of moisture in the mailpiece.

Other objects and advantages of the subject invention will be apparent to those skilled in the art from consideration of the detailed description set forth below and the attached drawings.

DETAILED DESCRIPTION OF PREFERRED EMBODIMENTS OF THE INVENTION

Figure 1:
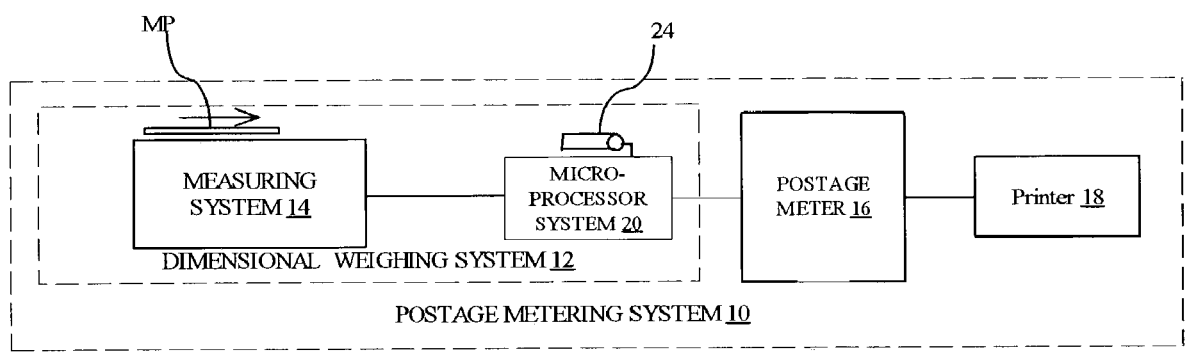
FIG. 1 shows a schematic diagram of a postage metering system in accordance with the present invention.

FIG. 1 shows postage metering system 10, which includes dimensional weighing system 12, postage meter 16 that accounts for postage expended, and printer 18. Dimensional weighing system 12 includes transport assembly 21 (shown in greater detail in FIG. 2), which supports a mail piece during a dimensional weighing operation and then transports the mail piece to printer 18 for printing with a postal indicium, or which diverts rejected mailpieces as will be described further below; measuring system 14, which generates outputs representative of the dimensions of mailpiece MP and of the values of other characteristics of mailpiece MP. Microprocessor system 20 provides programmable control for dimensional weighing system 12, receives the outputs of measuring system 14, evaluates the values of the other characteristics to determine if mailpiece MP includes materials other than paper, and if not computes an estimate of the weight of mailpiece MP by determining the volume of mailpiece MP from the dimensions received from measuring system 14 and multiplying that volume by a predetermined density, and determines and outputs to postage meter 16 the appropriate postage amount, as will be described further below. If mailpiece MP is evaluated as including material other than paper then microprocessor 20 controls diverter mechanism 24 to divert mailpiece MP for separate processing. Design of a suitable diverter mechanism is well within the ability of one skilled in the art and details of such design form no part of the subject invention.

Except as will be described further below with regard to the present invention, operation of such postage metering systems is well known and need not be described further here for an understanding of the present invention.

Figure 2:
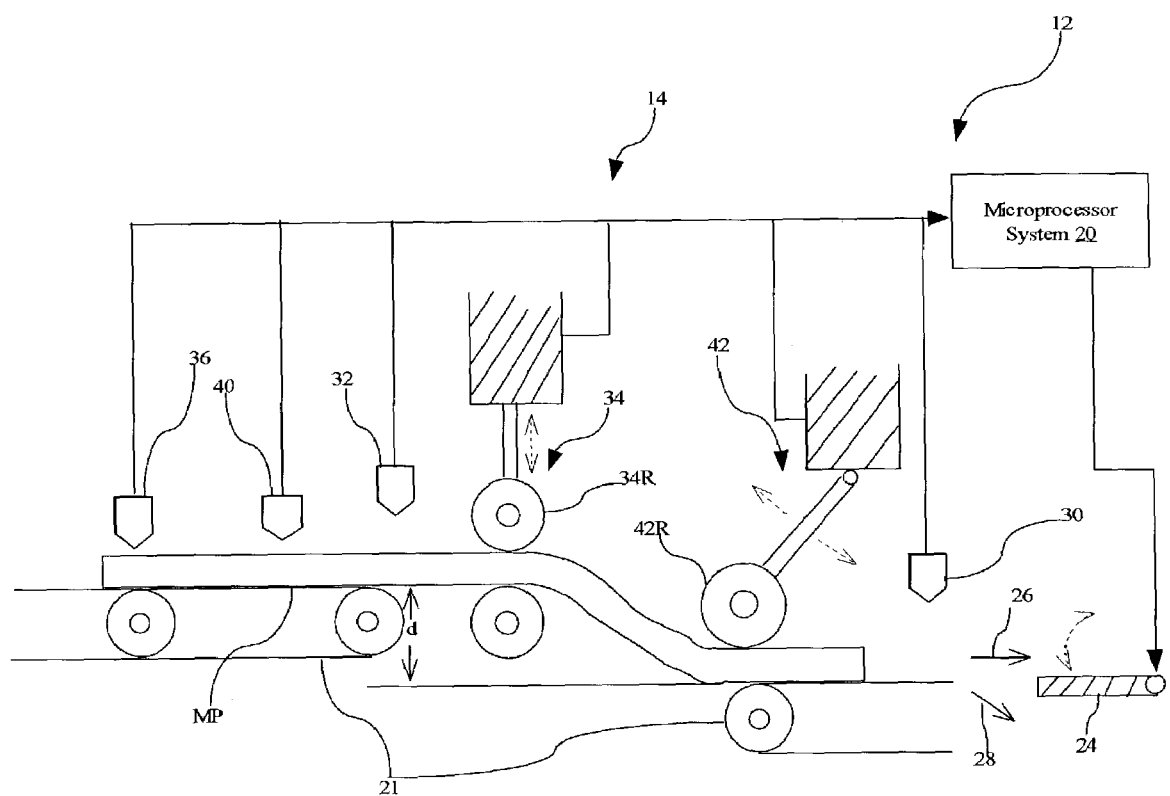
FIG. 2 shows a more detailed schematic diagram of the dimensional weighing system shown in FIG. 1.

In FIG. 2, as mailpiece MP is transported through measuring system 14 by transport 21 in a direction transverse to a cross sectional plane, its leading and trailing edges are detected by detector 30 to determine length l and its width w is determined by side edge detector 32. (Note that detector 32 can comprise either a pair of detectors for detecting both side edges or a single detector and a registration surface.) The thickness t of mailpiece MP is determined by detector 34, which includes vertically moveable roller 34R whose deflection corresponds to thickness t. The outputs of detectors 30, 32, and 34 are input to microprocessor 20 which generates numeric values l, w, and t and computes mailpiece volume v=l*w*t, then computes a weight estimate as v*d where d is a predetermined value for the density of paper (approximately 0.54 ounces/cubic inch).

Suitable detectors for the measurement of the dimensions of mailpieces or other item are readily commercially available and the design of systems to make such measurements as mailpieces are transported is well within the ability of those skilled in art. Accordingly it will be understood that particular details of the types of detectors used form no part of the present invention except as may expressly claimed.

Measurement system 14 also determines values for one or more other characteristics of mailpiece MP. These characteristics are selected so that if any of them have values outside of a predetermined range the presence of materials other than paper can be inferred. In the preferred embodiment shown the selected characteristics are:

The maximum mailpiece stiffness $S_{max}(t, w, t)$; where $S(t, w, t)$ is the stiffness of mailpiece MP measured around a particular cross section determined by time t and normalized to the values of t and w;

Dimensional uniformity $U(t)$; where U can be determined as $(t_{max}-t_{min})/t_{ave}$ or in any other convenient manner; where U=0 implies a perfectly smooth mailpiece. Those skilled in the art will recognize that care must be taken with transient thickness measurements at the leading and trailing edges of the mailpiece. (Note that in some embodiments, which are limited to substantially rectangular mailpieces, mailpieces can be rejected for variations in width w. However variations in w are not generally indicative of the presence of non-paper materials and in other embodiments where non-rectangular mailpieces are contemplated, w can be taken to be $w_{ave}$ or $w_{max}$ in determining v.);

Disturbance in the electromagnetic field em; where em is measured at each cross section as mailpiece MP moves through measuring unit 14. Metals or other conductive material swill have a shielding effect and the disturbance V(em) can be determined as $(em_{nom}-em_{min})$, where $em_{nom}$ is the nominal em field value detected through a mailpiece composed substantially only of paper.

Total moisture percentage M, which is taken to be the integral of the total moisture percentage m measured for each cross section (or summation if m is sampled).

As mailpiece MP is transported by transport 21 continuously through mailing system 14 moisture percentage m and electromagnetic field em are measured by detectors 36 and 40 respectively. Such detectors are readily commercially available and need not be discussed further here for an understanding of the present invention. S is measured by detector 42, which applies a force to mailpiece MP through roller 42R to deflect mailpiece MP through a predetermined distance d. Preferably the force (or torque) applied is input directly to controller 20 as a surrogate for stiffness S.

The values S, U, em, and m are input to controller 20, which computes $S_{max}$, U, V, and M. If each of these values is within predetermined limits; i.e.

$S_{max}$<Ks, U<Ku, V<Kem, and M<$K_M$, then we can say that that mailpiece Mp is smooth, its stiffness is similar to that of paper, no metallic material is included in mailpiece MP, and mailpiece MP does not contain enough moisture to significantly increase its weight. At this point controller 20 determines that mailpiece MP has the characteristics of paper and its density is no more than d (aprox. 0.54 ounces/in$^3$) and continues to compute volume v, estimate the weight as v*d and determine and output to meter 16 the appropriate postage, while mailpiece MP continues to printer 18 along path 26. Otherwise mailpiece MP is determined to be unsuitable for dimensional weighing and controller 20 activates diverter mechanism 24 to divert mailpiece MP along path 28 for separate processing.

Suitable values for Ks, Ku, Kem, and $K_M$ will vary for particular applications. For example, a greater degree of stiffness can be acceptable in a mail run where a significant number of mailpieces will contain card stock. Also values can vary substantially with the need to achieve a balance between false positives (i.e. unnecessarily rejecting a mailpiece) and false negatives (i.e. accepting a mailpiece which in fact has a density greater than d) for different applications. Appropriate limit values can easily be determined by those skilled in the art by making measurements on various sample mail pieces and applying well known statistical techniques.

Since the force required to deflect mailpiece MP is dependent on the geometry of measurement system 14 suitable values Ks are best determined for each particular design. Such determinations are well within the ability of those skilled in the art. In some applications it may be desirable to add an amount (e.g. aprox. 10%) to the weight estimate to allow for errors in measurement.

The embodiments described above and illustrated in the attached drawings have been given by way of example and illustration only. From the teachings of the present application those skilled in the art will readily recognize numerous other embodiments in accordance with the subject invention. Particularly other modifications of various indicia printed with different geometries will be apparent. Accordingly, limitations on the subject invention are to be found only in the claims set forth below.

What is claimed is:

1. A method for estimating the weight of a mailpiece in a mailing system, said method comprising:
   determining the volume of said mailpiece;
   determining a value for at least one other characteristic of said mailpiece;
   determining if said value for said at least one other characteristic of said mailpiece is outside of a corresponding predetermined range for said at least one other characteristic, said corresponding predetermined range being indicative of the presence of materials other than paper in said mailpiece;
   if said value for said at least one other characteristic is outside said corresponding predetermined range, diverting said mailpiece for separate processing; and
   if said value for said at least one other characteristic is not outside said corresponding predetermined range, estimating said weight of said mailpiece as a product of said volume and a predetermined density value for paper.

2. A method as described in claim 1, wherein determining the volume of said mailpiece includes measuring a length l, width w, and thickness t for said mailpiece as said mailpiece moves through said mailing system, where v is the volume of said mailpiece estimated as a function of l, w, and t, and estimating said weight of said mailpiece includes computing said weight estimate as $v*d$, where d is the predetermined density value for paper.

3. A method as described in claim 1 where said at least one other characteristic is stiffness a of said mailpiece.

4. A method as described in claim 1 where said at least one other characteristic is a dimensional uniformity of said mailpiece.

5. A method as described in claim 1 where said at least one other characteristic is a disturbance in an electro-magnetic field transmitted through said mailpiece.

6. A method as described in claim 1 where said at least one other characteristic is a percentage of moisture in said mailpiece.

7. A method as described in claim 1 further comprising:
   determining an appropriate postage amount for said mailpiece in accordance with said estimated weight of said mailpiece.

8. A system for estimating a weight for a mailpiece, said system comprising:
   a measuring system including a first plurality of detectors for measuring dimensions of said mailpiece and at least one other detector for determining a value for at least one other characteristic of said mail piece;
   a diverter mechanism; and
   a microprocessor system, responsive to said first plurality of detectors and said other detector for controlling said weighing system, said microprocessor system being programmed to:
     determine if said value is outside a corresponding predetermined range; and if so activate said diverter mechanism to divert said mailpiece for separate processing; and otherwise
     estimate a volume for said mailpiece as a function of said measured dimensions; and
     estimate said weight of said mailpiece as a product of said volume and a predetermined density value for paper.

9. A system as described in claim 8 where said at least one other characteristic is a stiffness of said mailpiece.

10. A system as described in claim 8 where said at least one other characteristic is a dimensional uniformity of said mailpiece.

11. A system as described in claim 8 where said at least one other characteristic is an electro-magnetic field variation of said mailpiece.

12. A system as described in claim 8 where said at least one other characteristic is a percentage of moisture in said mail piece.

13. A postage metering system comprising:
    a printer for receiving a mailpiece and printing a postal indicium thereon;
    a postage meter;
    a measuring system having a first plurality of detectors for measuring dimensions of said mailpiece as it is transported through said postage metering systems and at least one other detector for determining a value for at least one other characteristic of said mailpiece as it is transported;
    a diverter mechanism; and
    a microprocessor system, responsive to said first plurality of detectors and said other detector, said microprocessor system being programmed to:
      determine if said value is outside a corresponding predetermined range; and if so activate said diverter mechanism to divert said mailpiece for separate processing; and otherwise
      determine a volume for said mailpiece as a function of said measured dimensions;
      estimate a weight for said mailpiece as a product of said volume and a predetermined density value for paper; and
      provide said estimated weight to said postage meter for determining a postage amount in accordance with said estimated weight.

14. A system as described in claim 13 where said at least one other characteristic is a stiffness of said mailpiece.

15. A system as described in claim 13 where said at least one other characteristic is a dimensional uniformity of said mailpiece.

16. A system as described in claim 13 where said at least one other characteristic is an electro-magnetic field variation of said mailpiece.

17. A system as described in claim 13 where said at least one other characteristic is a percentage of moisture in said mailpiece.

* * * * *